United States Patent
Kusuyama

(10) Patent No.: US 7,038,860 B2
(45) Date of Patent: May 2, 2006

(54) PREFORM FOR AN OPTICAL LENS, AN OPTICAL LENS, AND A METHOD OF MANUFACTURING AN OPTICAL LENS

(75) Inventor: Yutaka Kusuyama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/893,218

(22) Filed: Jul. 19, 2004

(65) Prior Publication Data
US 2004/0264002 A1 Dec. 30, 2004

Related U.S. Application Data

(63) Continuation of application No. 10/140,432, filed on May 8, 2002, now Pat. No. 6,801,369.

(30) Foreign Application Priority Data
May 9, 2001 (JP) .......................... P2001-139209

(51) Int. Cl.
*G02B 13/18* (2006.01)
*G02B 3/02* (2006.01)

(52) U.S. Cl. ..................... 359/718; 359/641
(58) Field of Classification Search ............. 359/718, 359/708–712, 720, 668, 719, 641; 264/1.24, 264/2.7; 65/65–66, 86–88, 102, 105, 292
See application file for complete search history.

(56) References Cited

U.S. PATENT DOCUMENTS

| 2,151,573 | A | | 3/1939 | Stanley ........................ 359/710 |
|---|---|---|---|---|
| 5,020,888 | A | * | 6/1991 | Ishibai et al. ............... 359/708 |
| 5,080,706 | A | | 1/1992 | Snyder et al. ................ 65/102 |
| 5,081,639 | A | | 1/1992 | Snyder et al. ............... 372/101 |
| 5,155,631 | A | | 10/1992 | Snyder et al. .............. 359/708 |
| 5,293,269 | A | | 3/1994 | Burkhart et al. ............ 359/719 |
| 5,450,244 | A | * | 9/1995 | Fantone ...................... 359/710 |
| 5,745,519 | A | | 4/1998 | Ruda et al. ................. 372/101 |
| 5,790,576 | A | | 8/1998 | Waarts et al. ................. 372/43 |
| 5,867,327 | A | | 2/1999 | Snyder ....................... 359/710 |
| 6,075,650 | A | * | 6/2000 | Morris et al. ............... 359/641 |

(Continued)

FOREIGN PATENT DOCUMENTS

EP 0 503 006 6/1997

(Continued)

OTHER PUBLICATIONS

English Translation of International Preliminary Examination Report for International Application No. PCT/JP02/04494.

*Primary Examiner*—Jordan M. Schwartz
(74) *Attorney, Agent, or Firm*—Drinker Biddle & Reath LLP

(57) ABSTRACT

The method of manufacturing an optical lens in accordance with the present invention includes a drawing optical lens preform preparing step of preparing a drawing optical lens preform comprising a first curved face part, formed aspheric in one side face thereof, functioning as an optically active part, and a second curved face part, formed in a side face opposite from the first curved face part, having a curvature smaller than that of the first curved face part; a drawing step of drawing the drawing optical lens preform to a desirable outer diameter; and an optical lens preparing step of preparing an optical lens 1 by slicing the drawn drawing optical lens preform. Since the second curved face part is formed, distortions can be restrained from occurring due to the drawing in this manufacturing method.

4 Claims, 6 Drawing Sheets

U.S. PATENT DOCUMENTS

| | | | |
|---|---|---|---|
| 6,195,208 B1 * | 2/2001 | Ngoi et al. | 359/641 |
| 6,222,864 B1 | 4/2001 | Waarts et al. | 372/43 |
| 2003/0165292 A1 * | 9/2003 | Bhagavatula et al. | 385/33 |

FOREIGN PATENT DOCUMENTS

| | | |
|---|---|---|
| GB | 2 108 483 A | 5/1983 |
| JP | 57-145040 | 9/1982 |
| JP | 57-169706 | 10/1982 |
| JP | 57-175739 | 10/1982 |
| JP | 59-92935 | 5/1984 |
| JP | 3121614 | 5/1993 |
| WO | WO 92/06046 | 4/1992 |

* cited by examiner

PREFORM FOR AN OPTICAL LENS, AN OPTICAL LENS, AND A METHOD OF MANUFACTURING AN OPTICAL LENS

This is a continuation application of application Ser. No. 10/140,432, filed on May 8, 2002 now U.S. Pat. No. 6,801,369, which is incorporated by reference herein in its entirety.

BACKGROUND OF THE INVENTION

1. Field of the Invention

The present invention relates to an optical lens acting on light emitted from a light-emitting device, a method of manufacturing an optical lens, and a drawing optical lens preform for making an optical lens.

2. Related Background Art

Japanese Patent Publication No. 3121614 and U.K. Patent Application GB2108483A disclose methods of manufacturing a microlens by drawing. In the methods disclosed in these literatures, a columnar preform is prepared and then is drawn upon heating, whereby a columnar lens having a cross-sectional form substantially the same as that of the preform is formed.

In such a conventional method of manufacturing an optical lens, the preform may incur distortions and the like in the process of drawing, thus deforming, whereby there have been cases where an optically active part to act on incident light is not formed as designed.

SUMMARY OF THE INVENTION

Therefore, it is an object of the present invention to provide an optical lens preform, a method of manufacturing an optical lens, and an optical lens in order to manufacture an optical lens as designed.

For achieving the above-mentioned object, the drawing optical lens preform in accordance with the present invention is a drawing optical lens preform, formed like a pillar from a translucent material, comprising a first curved face part formed by an aspheric surface in one side face and a second curved face part, formed in a side face opposite from the first curved face part, having a principal curvature smaller than that of the first curved face part. The principal curvature described in this specification refers to the curvature of a circle (columnar face) obtained when a curve (curved face) is approximated by the circle (columnar face).

In such a drawing optical lens preform, since the second curved face part is formed, distortions are restrained from occurring due to drawing as compared with cases made flat.

Also, since the curved face part is divided into first and second curved face parts whereas the first curved face part having the greater curvature is formed aspheric, distortions are less likely to occur due to drawing, whereby the aspheric surface form can be restrained from deteriorating.

Here, both of "aspheric surface" and "spherical surface" (mentioned later) refer to forms of curved faces parallel to a pillar axis direction 80 shown in FIG. 1A, such as the first curved face part 43, e.g., individual parts constituting the outer form of a cross section taken along a surface orthogonal to the pillar axis direction. Then, "aspheric surface" refers to a curved form constituted by a curve having at least two curvatures. For example, it refers to a form in which the curvature of the curved part on the inner side (center part) is made greater than that in the outer side (peripheral part) in the present invention.

Preferably, the second curved face part is formed by a spherical surface. This makes it easier to form the second curved face part. Here, "spherical face" refers to a curved face having a single curvature.

The second curved face part may be a convex surface.

Also, the second curved face part may be a concave surface.

The method of manufacturing an optical lens in accordance with the present invention includes a drawing optical lens preform preparing step of preparing one of the above-mentioned drawing optical lens preforms; a drawing step of drawing the drawing optical lens preform prepared by the drawing optical lens preform preparing step to a desirable outer diameter; and an optical lens preparing step of slicing the drawing optical lens preform drawn by the drawing step; wherein at least the first curved face part in the first and second curved face parts in the drawing optical lens preform drawn by the drawing step functions as an optically active part acting on incident light or outgoing light.

In such a method of manufacturing an optical lens, since the form of the optical lens, the form of the optically active part in particular, can be determined in a stage prior to the drawing, it can be processed while in a sufficiently large size.

When the second curved face part is formed so as to yield a curved face as a result of drawing, the first and second curved face parts function as an optically active part in thus prepared optical lens. When the second curved face part is formed so as to yield a flat face as a result of drawing, the first curved face part functions as an optically active part in thus prepared optical lens.

Here, "acting on light" refers to an action in which incident divergent light is emitted with its angle of divergence being reduced. On the other hand, "slicing" encompasses cutting the drawn drawing optical lens preform and shaving it into a desirable form or size.

Preferably, in the drawing optical lens preform preparing step, the curvature of the second curved face part is determined according to a curvature for carrying out a desirable optical action and an amount of deformation occurring due to drawing. As a consequence, the curvature of the second curved face part is determined in view of the amount of deformation which may occur due to drawing, whereby the deformation upon drawing can be suppressed to minimum after the drawing.

In another aspect, the method of manufacturing an optical lens in accordance with the present invention includes a drawing step of drawing one of the above-mentioned drawing optical lens preforms to a desirable outer diameter; and an optical lens preparing step of preparing an optical lens by slicing the drawing optical lens preform drawn by the drawing step; wherein at least the first curved face part in the first and second curved face parts in the drawing optical lens preform drawn by the drawing step functions as an optically active part acting on incident light or outgoing light.

The optical lens in accordance with the present invention is made by one of the above-mentioned methods of manufacturing an optical lens.

Since the preform is processed while in a sufficiently large size whereas the provision of the second curved face part restrains the drawing optical lens preform from distorting in the drawing step, thus prepared optical lens can accurately act on light.

Preferably, this optical lens is an optical lens acting on light emitted from a semiconductor laser device, whereas light enters the second curved face part and exits from the first curved face part. As a consequence, the outer peripheral portion in the second curved face part, which is likely to generate distortions upon drawing, can be kept from being used as the optically active part.

It is also an object of the present invention to provide an optical lens, constituted by a pair of surfaces substantially parallel to each other and a curved face connecting the pair of faces to each other, yielding a substantially fixed cross section along a surface parallel to the pair of surfaces, the cross section being defined by a noncircular first curve, a second curve having a principle curvature smaller than that of the first curve and opposing the first curve, and third and fourth curves connecting both ends of the first and second curves to each other.

Also provided is an optical lens in which principle curvature centers of the third and fourth curves are disposed outside the above-mentioned cross section. This form exhibits a state in which parts of the third and fourth curves where neither incident light nor outgoing light transmits therethrough are slightly recessed inward.

It is also an object of the present invention to provide an optical lens, having a substantially fixed cross section in a surface orthogonal to a longitudinal direction, made by drawing and cutting an optical lens preform having a form substantially similar to the cross section, wherein curve parts corresponding to the first and second curves have respective principle curvatures greater than those of the first and second curves corresponding thereto.

Further, it is an object of the present invention to provide an optical lens, having a substantially fixed cross section in a surface orthogonal to a longitudinal direction, made by longitudinally drawing and cutting an optical lens preform having a form substantially similar to the cross section, and a cross section constituted by fifth and sixth curve parts corresponding to the first and second curves and a substantially linear part corresponding to the third and fourth curves, wherein the first and second curve parts have respective principle curvatures greater than those of the fifth and sixth curves.

Furthermore, it is an object of the present invention to provide an optical lens configured such that light enters from a surface constituted by the second curve part and exits from a surface constituted by the first curve part.

As a consequence of such a configuration, the focal length can be elongated by using such an optical lens, which can make it easier to set lenses arranged on the inner side of this optical lens.

It is also an object of the present invention to provide an optical lens preform, constituted by a translucent material, having a substantially fixed cross-sectional form along a plane orthogonal to a longitudinal direction, the cross-sectional form being defined by a noncircular first curve part, a second curve part having a principle curvature smaller than that of the first curve part and opposing the first curve part, and third and fourth line segments connecting both ends of the first and second curve parts to each other, wherein the first and second curve parts are constituted by at least a curve part having a plurality of curvatures.

Further, it is an object of the present invention to provide an optical lens preform configured such that curved parts of center portions of the first and second curve parts have respective principle curvatures greater than those of curved parts of peripheral portions thereof.

DETAILED DESCRIPTION OF THE PREFERRED EMBODIMENTS

In the following, embodiments of the present invention will be explained in detail with reference to the drawings. In the following explanation, parts identical or equivalent to each other will be referred to with numerals identical to each other without repeating their overlapping descriptions.

Figure 1A:
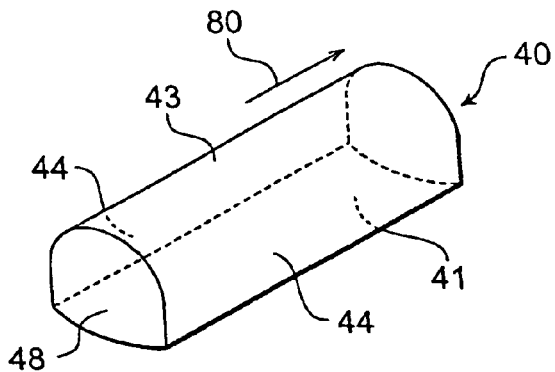
FIGS. 1A to 1C are schematic views showing individual steps in the method of manufacturing an optical lens in accordance with an embodiment.
Figure 1B:
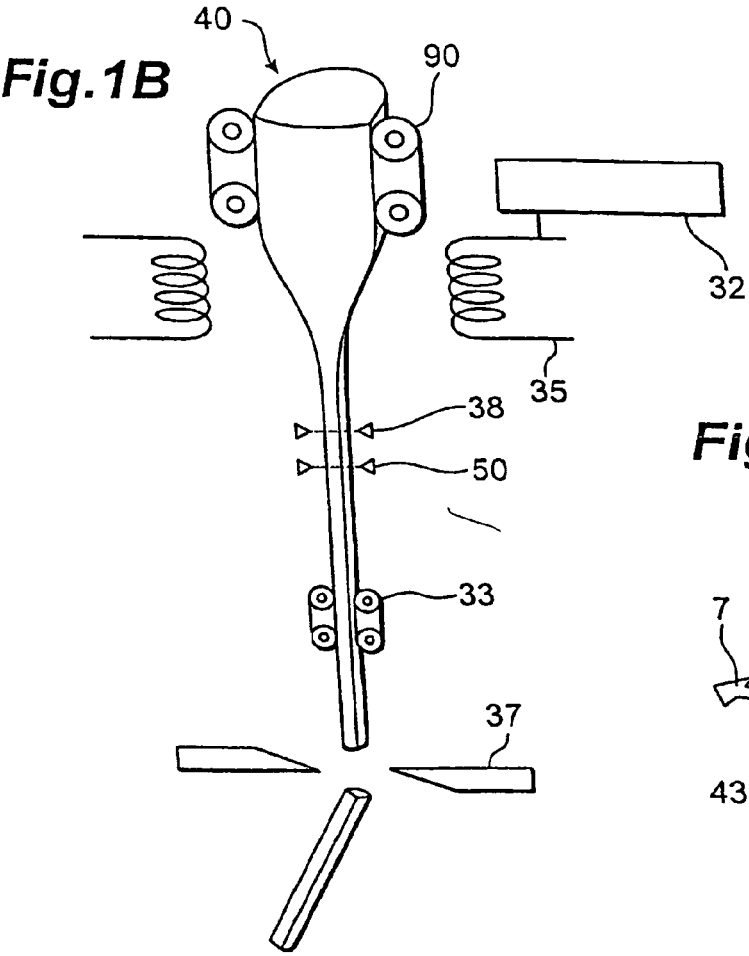
Figure 1C:
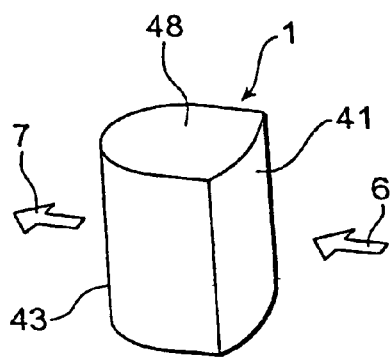

FIGS. 1A to 1C are schematic views showing individual steps in the method of manufacturing an optical lens in accordance with an embodiment. Though three embodiments will be illustrated, explanations concerning FIGS. 1A to 1C correspond to all the embodiments.

As shown in FIG. 1A, a pillar optical member formed from a translucent glass material is initially prepared and then is shaped into a form comprising a first curved face part 43 constituted by a convex surface in one side face, a second curved face part 41 similarly constituted by a convex surface in the other side face, and a pair of lateral planar parts 44 constituted by a pair of flat faces, so as to prepare a drawing optical lens preform 40 (drawing optical lens preform preparing step). The drawing optical lens preform 40 has a pillar form, whereas each of the first curved face part 43 and second curved face part 41 is a curved face parallel to a pillar axis direction 80.

The first curved face part 43 on the upper side is a part to become an optically active part 43 of an optical lens 1 formed by this manufacturing method, and is formed by an aspheric surface. Configuring it into an aspheric surface is advantageous in that actions caused by the optically active part, those in the outside of the curved face part in particular, can effectively be used (aberrations can be eliminated). The second curved face part 41 has a curvature smaller than that of the first curved face part 43 and is formed by a spherical surface. Therefore, the second curved face part 41 also acts on light though with a small curvature, whereby it is necessary that amounts of actions of both the first curved face part 43 and second curved face part 41 on light be taken into consideration in the designing stage. The optically active part 43 formed by the "spherical surface" and "aspheric surface" does not operate two-dimensionally but one-dimensionally. The reason why the second curved face part 41 is provided in addition to the first curved face part 43 will be explained later. The pair of lateral planar parts 44 are formed parallel to each other. This facilitates an arranging operation when arranging a plurality of products in contact with each other into an array.

Thus, in the method of manufacturing an optical lens by a drawing technique, the shape of an optical lens to be prepared, the shape of its optically active part in particular, can be formed in the state of the drawing optical lens preform 40 having a sufficiently large size (e.g., having width and height of 2 to 6 cm and a length of 20 cm to 200 cm), whereby these operations can be carried out simply and accurately.

Japanese Patent Publication No. HEI 7-15521 discloses a method of manufacturing a refractive index distribution type columnar lens (SELFOC lens) by a drawing technique. As a preform, this method uses a highly pure silica glass type rod in which the dopant amount of fluorine increases stepwise from the center to the radially outer side so that the refractive index accordingly decreases stepwise, without using one in which the preform is physically formed with an optically active part as in the present invention. While such a conventional manufacturing method requires, as a preform preparing step, a step of forming a refractive index distribution by doping it with fluorine by plasma outside deposition or immersing it in a molten salt so as to effect ion exchange, the present invention does not require such a step. It also differs from the present invention in that the light entrance face and light exit face do not use columnar curved side faces but both end parts thereof in thus formed optical lens 1.

Subsequently, as shown in FIG. 1B, the drawing optical lens preform 40 shaped by the drawing optical lens preform preparing step is heated by an electric furnace 35 and the like to a yield point of the glass material or higher and drawn so as to attain a desirable size (drawing step). Desirably, the electric furnace 35 is formed like a ring so as to surround the drawing optical lens preform 40, and evenly heats the drawing optical lens preform 40 equidistantly from thereabout. A temperature regulator 32 is connected to the electric furnace 35, whereby the temperature of the electric furnace 35 can be changed so as to adjust the drawing temperature. For drawing and expanding the heated drawing optical lens preform 40, feeding rollers 90 for feeding the preform 40 into the electric furnace 35 and pulling rollers 33 are used. When drawing a semi-columnar drawing optical lens preform such as the one mentioned above, the drawing optical lens preform 40 can be prevented from twisting during the drawing if the pair of drawn lateral planar parts 44 are held between the pulling rollers 33.

The drawing optical lens preform 40 is cut by a cutter 37 placed under the pulling rollers 33, when it is determined that the outer diameter thereof has attained a desirable value (0.5 to 15 mm) as a result of the drawing. This determination is effected by a line diameter meter 38 placed upstream the pulling rollers 33. The line diameter meter 38 is constituted by a laser section for emitting a laser beam, a light-receiving section for receiving the laser beam transmitted through the drawing optical lens preform 40, and an analyzing section for calculating the outer diameter of the drawing optical lens preform 40 from the quantity of light received by the light-receiving section and the like. The optical lens formed as being cut with the cutter 37 has a rod shape having a length of 5 mm to 2000 mm and may have a size usable as an optical lens or a size in a stage before being cut into a desirable length or being ground (optical lens preparing step). It will be likely to break if it is too long, whereas it will be inconvenient for cutting and grinding if it is too short. While a drawn product is wound about a drum or the like when making an optical fiber and the like, the making of an optical lens is characterized in that thus drawn product is cut.

Concerning thus drawn optical lens, as will be explained later, functions of its optically active part 43 and the like may be inspected by use of an actual light source (inspecting step), the drawing environment is adjusted based on results of the inspection (drawing environment adjusting step), and drawing may be newly carried out in thus adjusted environment, whereby an optical lens comprising a desirable form can be made. In this case, the drawn drawing optical lens preform 40 may be cut, so as to prepare a sample for inspection, which may be inspected thereafter.

Thus prepared optical lens 1 has a cross-sectional form identical to that of the drawing optical lens preform 40 due to characteristics of the drawing. The optical lens, the optically active part 43 made of a convex surface in particular, is not subjected to shaping except for cutting into a desirable length after the drawing, whereby the burden on the manufacture can be alleviated. The planar parts 44 and end part 48 other than the optically active part 43 may be ground so as to attain desirable sizes. In the optical lens 1, as shown in FIG. 1C, incident light 6 is collimated or condensed by the optically active part 43 formed on the light exit side, and emits out going light 7. Providing curved face parts on both of the light entrance side and light exit sides is advantageous in that the curved face on the light entrance side becomes active, whereby the arranged position can accordingly be distanced further from the light-emitting source. Also, when respective curvatures of two curved face parts are made different from each other, the distance from the light-emitting source can be adjusted.

Figure 2:
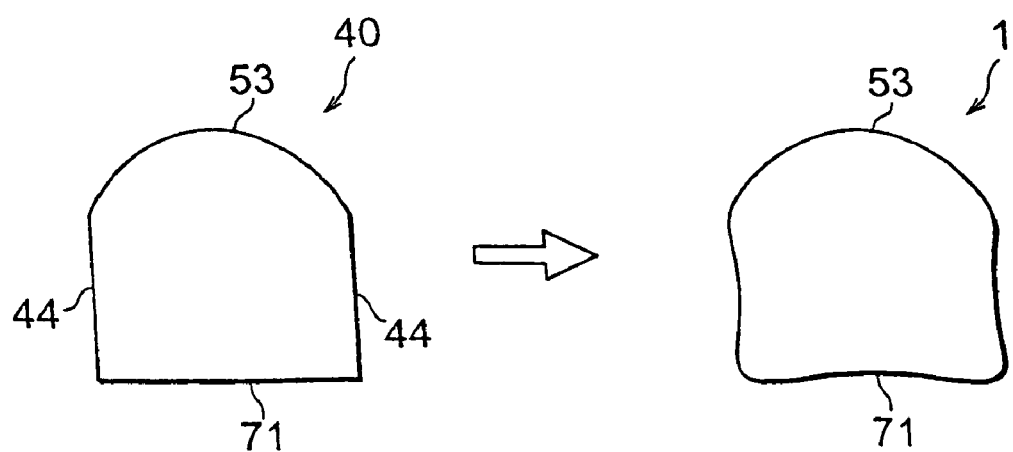
FIG. 2 shows a sectional view of a drawing optical lens preform in accordance with a comparative example, and a sectional view of an optical lens prepared by drawing this drawing optical lens preform.

FIG. 2 shows a sectional view of a drawing optical lens preform in accordance with a comparative example, and a sectional view of an optical lens prepared by drawing this drawing optical lens preform. The drawing optical lens preform 40 shown as a sectional view on the left side of FIG. 2 comprises a curved face part 53 having a convex shape formed in one side face, a planar part 71 formed in the side face opposite from the curved face part 53, and a pair of lateral planar parts 44 formed between the curved face part 53 and planar part 71. The pair of lateral planar parts 44 are substantially parallel to each other.

As characteristics of the drawing step, the cross-sectional form of the preform deforms upon heating unless the temperature and feeding speed are optimal. Namely, as shown on the right side of FIG. 2, the pair of side face parts 44, planar part 71, and their corners in the optical lens preform 40 deform due to the drawing step. Though deformations vary depending on the drawing environment, FIG. 2 shows a case where recessing deformations occurred. For ease of explanation, the deformations caused by the drawing step are exaggerated in FIG. 2 (as in FIGS. 3A to 3C and FIGS. 4A to 4C).

Figure 3A:
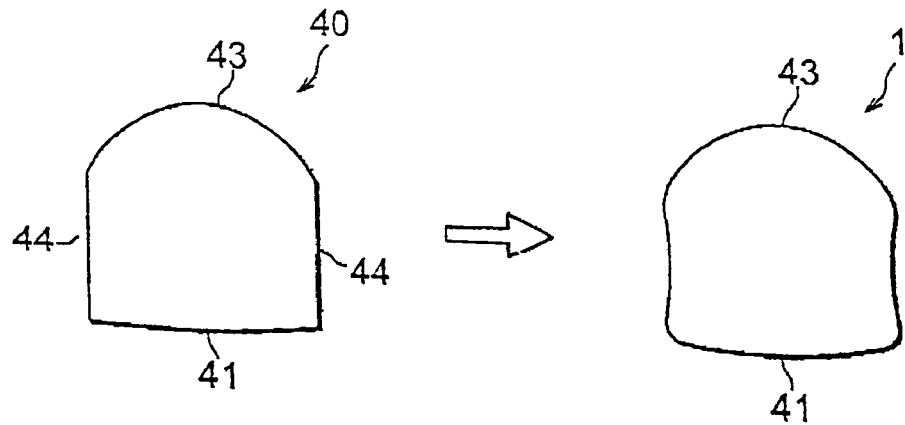
FIGS. 3A to 3C are sectional views showing drawing optical lens preforms in accordance with a first embodiment and optical lenses prepared by drawing these drawing optical lens preforms.
Figure 3B:
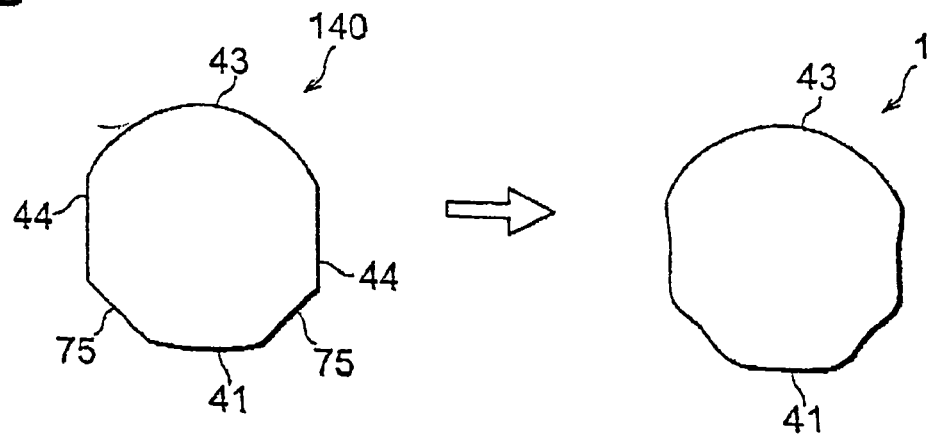
Figure 3C:
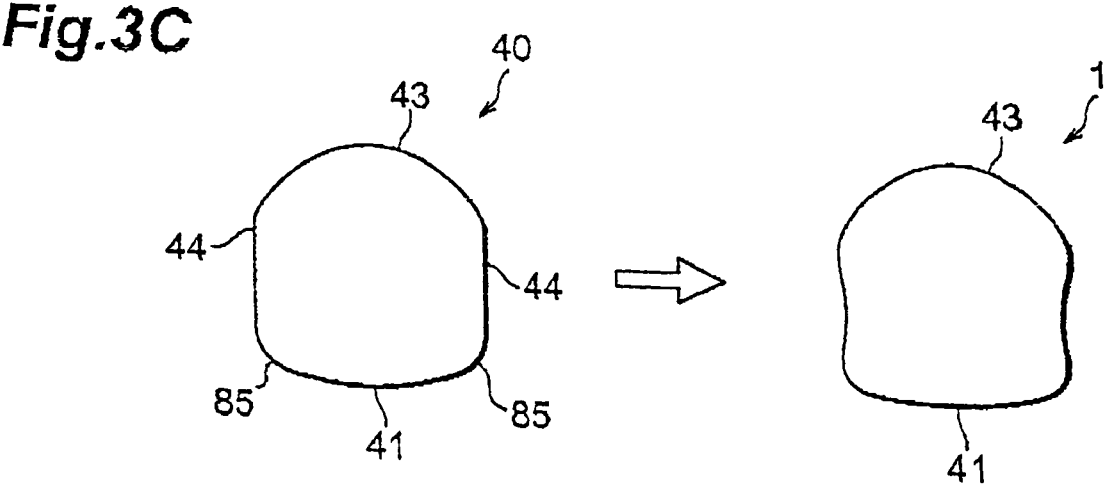

FIGS. 3A to 3C are sectional views showing drawing optical lens preforms in accordance with a first embodiment and optical lenses prepared by drawing these drawing optical lens preforms. The drawing optical lens preform 40 shown as a sectional view on the left side of FIG. 3A comprises a first curved face part 43 having a convex shape formed in one side face; a second curved face part 41, formed in a side opposite from the first curved face part 43, having a convex shape and a curvature smaller than that of the first curved face part 43; and a pair of lateral planar parts 44 formed between the first curved face part 43 and the second curved face part 41. As in FIG. 2, the pair of lateral planar parts 44 are parallel to each other. On the other hand, the drawing optical lens preform 40 shown on the left side of FIG. 3B further comprises a pair of chamfered faces (recessed faces) 75 formed between the pair of lateral planar parts 44 and the second curved face part 41. The drawing optical lens preform 40 shown on the left side of FIG. 3C is one in which the pair of chamfered faces (recessed faces) 75 in the drawing optical lens preform 40 shown in FIG. 3B are formed by curved faces (chamfered faces (recessed faces) 85).

When the second curved face part 41 is formed into a convex surface as in the first embodiment, the overall form of the drawing optical lens preform accordingly approximates a columnar form as can be seen from the cross-sectional forms of optical lenses shown on the right side of FIGS. 3A to 3C, whereby the distorting phenomenon of the preform caused by the drawing step itself can be reduced. The second curved face part 41 is formed while taking account of the amount of deformation which may occur due to drawing, and is designed so as to attain a desirable curved face part after drawing (as in drawing optical lens preforms 40 shown in FIGS. 4A to 4C).

Also, as shown in FIGS. 3B and 3C, the drawing optical lens preform 40 is formed with a pair of chamfered faces (recessed faces) 75. When the preform has a shape closer to a columnar form, distortions can further be restrained from occurring in corners at the time of drawing (as in the drawing optical lens preforms 40 shown in FIGS. 4A to 4C).

Further, since the first curved face part 43 formed into an aspheric surface has a large curvature, distortions are less likely to occur due to drawing (except for its corner portions, which will be explained later), whereby the aspheric form can be restrained from being lost due to drawing (as in the drawing optical lens preforms 40 shown in FIGS. 4A to 4C). If the occurrence of distortions is suppressed, an optical lens 1 in which the designed amount of action of the optically active part 43 is accurately set can be realized.

Figure 4A:
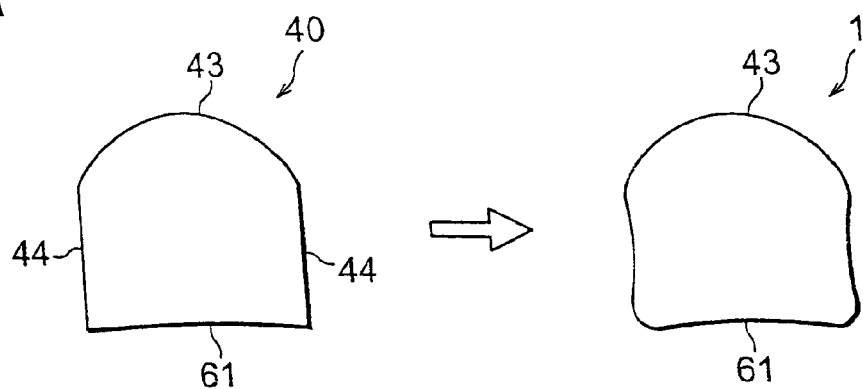
FIGS. 4A to 4C are sectional views showing drawing optical lens preforms in accordance with a second embodiment and optical lenses prepared by drawing these drawing optical lens preforms.
Figure 4B:
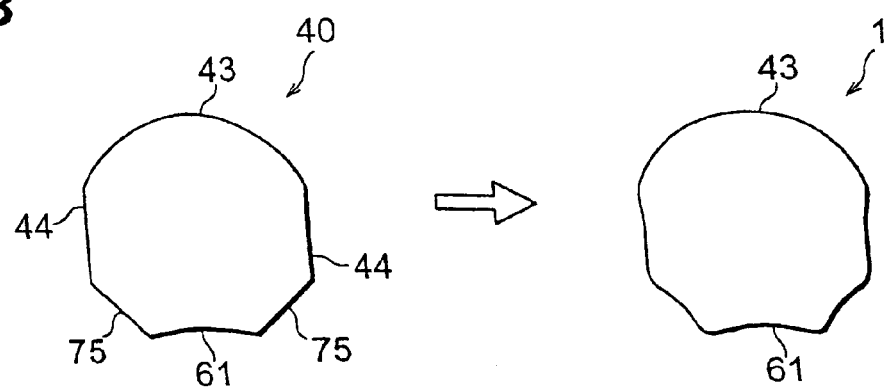
Figure 4C:
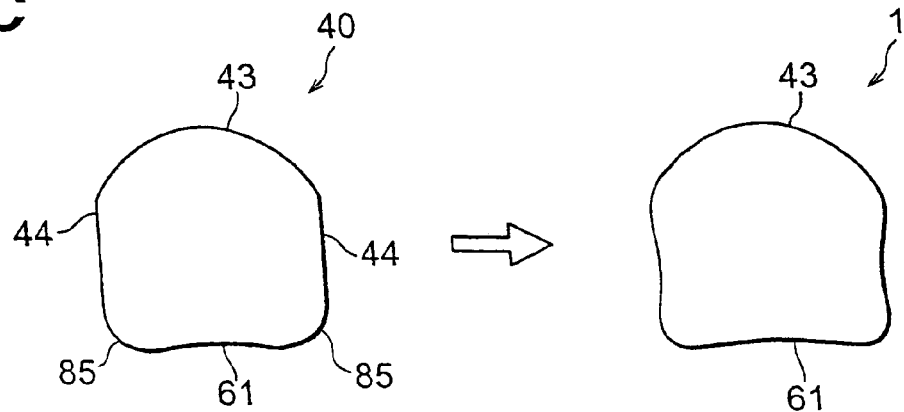

FIGS. 4A to 4C are sectional views showing drawing optical lens preforms in accordance with a second embodiment and optical lenses prepared by drawing these drawing optical lens preforms. The drawing optical lens preform 40 shown as a sectional view in FIG. 4A comprises a first curved face part 43 having a convex shape formed in one side face; a second curved face part 61, formed in a side opposite from the first curved face part 43, having a concave shape and a curvature smaller than that of the first curved face part 43; and a pair of lateral planar parts 44 formed between the first curved face part 43 and second curved face part 61. As in FIGS. 2 and 3, the pair of lateral planar parts are parallel to each other. On the other hand, the drawing optical lens preform 40 shown in FIG. 4B further comprises a pair of lateral planar parts 44 and a pair of chamfered faces (recessed faces) 75 formed between the pair of lateral planar parts 44 and the second curved face part 61. The drawing optical lens preform 40 shown in FIG. 4C is one in which the pair of chamfered faces (recessed faces) 75 in the drawing optical lens preform 40 shown in FIG. 4C are formed by curved faces (chamfered faces (recessed faces) 85).

When the second curved face part 61 is formed into a concave surface as in the second embodiment, as can be seen from cross-sectional forms of the optical lenses shown on the right side in FIGS. 4A to 4C, the shape of the form of the drawing optical lens preform 40 has already been made closer to the state to be obtained after being distorted, whereby the second curved face part 61 can be restrained from deforming due to drawing.

Japanese Patent Publication No. 3121614 discloses a drawing optical lens preform in which one side face is formed with a curved face whereas the other side face is formed with a plane as shown in FIG. 2. If such a preform is drawn, the flat part will greatly deform in the drawing step as mentioned above, thereby changing optical characteristics of the optical lens prepared.

Also, the above-mentioned publication discloses a drawing optical lens preform in which both side faces are formed into the same curved face shape. When this curved face is formed into an aspheric surface, its corner with respect to a lateral planar part has a state more pointed than that in the case formed into a spherical surface since the curvature on the outer side of the curved face part is set smaller than that on the inner side. As a consequence, it may be problematic in that the shape of this corner portion is likely to deform (or likely to deform so as to be dragged to the inner side of the curved face part having a greater curvature) in the drawing step. Since the aspheric surface is originally formed in order to improve optical characteristics, deformations in this portion may inversely damage characteristics of the optical lens to be prepared.

In the drawing optical lens preform 40 in accordance with this embodiment, one side face is formed into a curved face (second curved face part 41, 61) having a small curvature, so that its corner portions have a form more pointed than the corners on the first curved face part 43 side, thus being likely to deform upon drawing. However, when distortions are intentionally generated in these corner portions, it may be expected to be effective in that the internal energy generated upon distorted deformations caused by drawing totally concentrate at these corner portions, whereby the aspheric surface form of the first curved face part 43 is less likely to deteriorate. As will be explained later, there will be no problems in terms of optical characteristics in the corner portions of the second curved face part 41, 61 even if distortions occur therein. If the second curved face part 41, 61 is formed into a spherical surface, distortions will be less likely to occur than in the case formed into an aspheric surface. The second curved face part 41, 61 may be designed as such in cases where distortions should be restrained from occurring in corner portions thereof as well.

Figure 5:
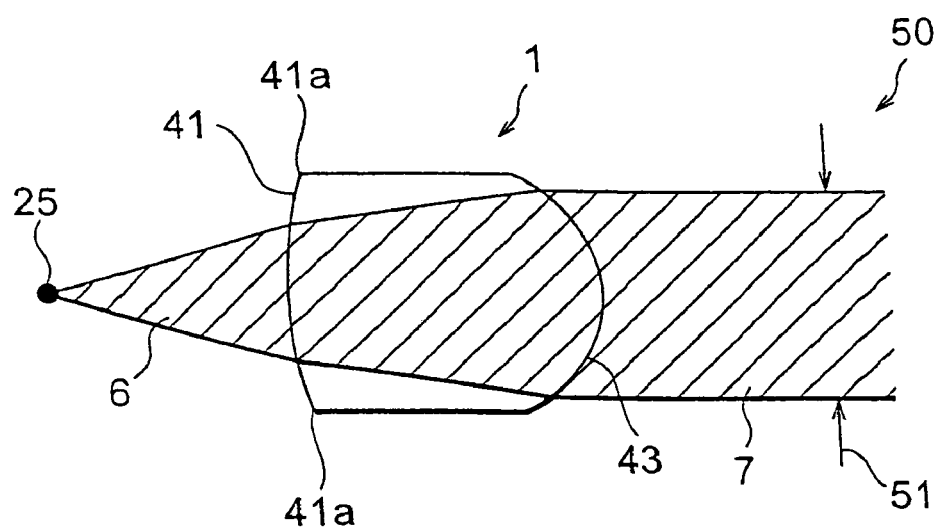
FIG. 5 is a schematic view showing an inspecting step.

FIG. 5 is a schematic view of an inspecting step. It shows a method for inspecting functions of the optically active part 43 after drawing. This inspection is carried out by an optically active part inspecting apparatus 50 comprising light-emitting means and light-receiving means. Light (incident light 6; divergent light) emitted from a semiconductor laser light source 25 acting as light-emitting means is made incident on the second curved face part 41, collimated by the optically active part 43 formed on the exit face side thereof, emitted (outgoing light 7) therefrom, and received by a semiconductor light-receiving sensor acting as light-receiving means, whereby its width of expansion 51 is measured. As a consequence, the amount by which the optically active part 43 (first curved face part) acts on light is inspected while a state where the optical lens 1 is actually used or a state close thereto is reproduced. Since the optical lens 1 in accordance with this embodiment also comprises the second curved face part 41 adapted to act on light as mentioned above, actions effected by the optical lens 1 as a whole including those effected by the second curved face part 41 are investigated.

According to results of the investigation of the optically active part 43 in the inspecting step, the drawing environment in the drawing step is adjusted so that the inconveniences indicated in the results of investigation are kept from occurring as a drawing environment adjusting step, and the drawing optical lens preform 40 is drawn again in thus newly adjusted drawing environment, whereby the optical lens 1 adapted to act accurately on light is prepared. An example of the drawing environment is the temperature for heating the preform, whereby the heating temperature of the electric furnace 35 is adjusted by the temperature regulator 32. Instead of the preform heating temperature, the drawing environment can be adjusted by changing speeds of the feeding rollers 90 and pulling rollers 33. It has been known that the form of the drawing optical lens preform 40 is easier to hold even after the drawing as the feeding speed is higher.

Though the drawing optical lens preform 40 on the drawing line can be inspected as shown in FIG. 1B in the above-mentioned inspecting step, the drawing optical lens preform 40 may be partly cut so as to prepare an inspection sample, which can be inspected thereafter. When inspecting the drawing optical lens preform 40 on the drawing line, the semiconductor laser as light-emitting means and semiconductor light-receiving sensor as light-receiving means are placed on the drawing line. At the same time, a control circuit for controlling the semiconductor laser, semiconductor light-receiving sensor, and temperature regulator 32 is provided. This method makes it possible to construct a system which can adjust the drawing environment according to results of an inspection without stopping the line, i.e., automatically monitor the drawing state and adjust the drawing environment. The case carrying out an inspection with a cut inspection sample is advantageous in that the inspection becomes easier.

As can be seen from the view of inspecting step shown in FIG. 5, when the second curved face part 41 is used as a light entrance face, the outer peripheral part of the curved face is not used as an optically active part. Though peripheries of the corner portions 41a are likely to deform under the influence of heating due to drawing, it is not used as the optically active part in the optical lens 1 in accordance with this embodiment as such, thus being restrained from adversely affecting optical actions.

Figure 6:
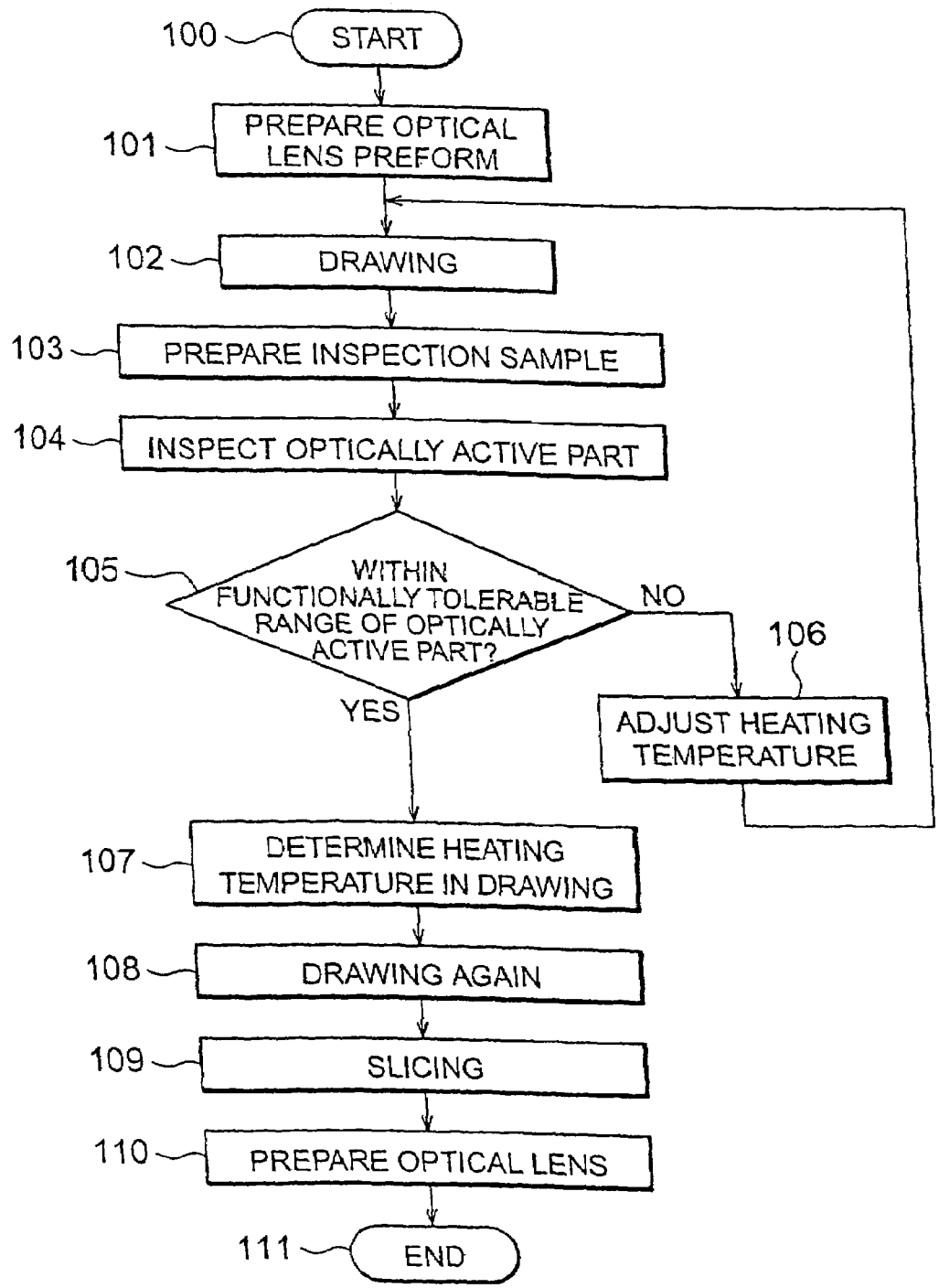
FIG. 6 is a flowchart showing a series of steps in the method of manufacturing an optical lens in accordance with an embodiment.

FIG. 6 is a flowchart showing a series of steps in the method of manufacturing an optical lens in accordance with an embodiment. Though three embodiments are illustrated, explanations concerning FIG. 6 correspond to all the embodiments. Starting at step 100, the drawing optical lens preform 40 shown in FIG. 1A is prepared in step 101 (drawing optical lens preform preparing step). In step 102, the drawing optical lens preform 40 prepared in step 101 is drawn (drawing step). Subsequently, an inspecting step begins, whereby the drawn drawing optical lens preform 40 is initially cut in step 103, so as to prepare an inspection sample.

In step 104, whether the optically active part 43 in the drawn drawing optical lens preform 40 is formed normally or not (whether a function of the optically active part 43 falls within a tolerable range or not) is inspected by a method such as the one shown in FIG. 5. If the function of thus formed optically active part 43 falls within the tolerable range, then the flow proceeds to step 107, where the heating temperature in the drawing is determined. If the function is outside the tolerable range, then the flow proceeds to step 106, where the heating temperature is adjusted as an adjustment for the drawing and drawing environment, before returning to step 102 again.

Instep 108, drawing is carried out again at the drawing temperature determined by step 107; whereas the drawn drawing optical lens preform 40 is cut with the cutter 37, and thus cut part is shaved (by slicing) instep 109. These accomplish preparing the optical lens 1 in step 110, thereby completing the procedure (step 111).

Though the present invention is specifically explained with reference to its embodiments in the foregoing, the present invention is not limited to the above-mentioned embodiments merely showing best modes for carrying out the same, and encompasses all the modifications of the present invention falling within the scope of claims thereof, while being modifiable in terms of forms, sizes, arrangements, and the like.

In the method of manufacturing an optical lens in accordance with the present invention, since the form of the optical lens, the form of the optically active part in particular, can be determined in a preform stage prior to drawing, it can be processed while in a sufficiently large size, whereby a shape of the optical lens, a shape of the optically active part in particular, can easily be formed. This realizes an optically active part which can accurately act on light. Also, the burden in the manufacture can be alleviated.

Further, since the second curved face part is formed into a curved face, inconveniences occurring due to the distorting phenomenon of the drawing optical lens preform in the drawing step are alleviated. Also, since an aspheric surface capable of effectively carrying out an optical action is formed in the first curved face having a large curvature, distortions are hard to occur due to the drawing step, whereby the aspheric surface form is less likely to deteriorate.

What is claimed is:

1. A light source apparatus comprising:
    a semiconductor laser light source for emitting a laser light; and
    an optical lens having:
        a front surface having a first curve for receiving the laser light emitted from the semiconductor laser light source therein; and
        a back surface having an aspherical second curve and being opposite to the front surface through a lens body, for exiting collimated laser light therefrom based on the laser light received in the optical lens,
    wherein the optical lens comprises:
        a pair of surfaces substantially parallel to each other; and
        a curved face connecting said pair of surfaces to each other,
    said optical lens yielding a substantially fixed cross section along a surface parallel to said pair of surfaces; the first curve having a principle curvature smaller than that of the second curve and opposing the second curve; said cross section being defined by the second curve, the first curve, and third and fourth lines connecting both ends of the first and second curves to each other, wherein the third and fourth lines comprise curves.

2. The light source according to claim 1, wherein the optical lens being formed from an optical lens preform having a substantially fixed cross section in a surface orthogonal to a longitudinal direction, said optical lens being made by drawing and cutting said optical lens preform having a form substantially similar to said cross section of said optical lens.

3. A light source apparatus comprising:
    a semiconductor laser light source for emitting a laser light; and
    an optical lens having:
        a front surface having an aspherical first curve for receiving the laser light emitted from the semiconductor laser light source therein; and
        a back surface having a second curve and being opposite to the front surface through a lens body, for exiting collimated laser light therefrom based on the laser light received in the optical lens;
wherein the optical lens comprises:
a pair of surfaces substantially parallel to each other; and
a curved face connecting said pair of surfaces to each other,
said optical lens yielding a substantially fixed cross section along a surface parallel to said pair of surfaces; the first curve opposing said second curve; said cross section being defined by the second curve, the first curve, and third and fourth lines connecting both ends of the first and second curves to each other, wherein the third and fourth lines comprise curves.

4. The light source according to claim 3, wherein the optical lens being formed from an optical lens preform having a substantially fixed cross section in a surface orthogonal to a longitudinal direction, said optical lens being made by drawing and cutting said optical lens preform having a form substantially similar to said cross section of said optical lens.

* * * * *